United States Patent
Herterich et al.

(10) Patent No.: US 6,651,494 B1
(45) Date of Patent: Nov. 25, 2003

(54) MEANS FOR MONITORING HOLDING BRAKE WEAR

(75) Inventors: Thomas Herterich, Diebach (DE); Wolfgang Rüppel, Frammersbach (DE); Eberhard Schemm, Lohr (DE)

(73) Assignee: Mammesmann AG, Düsseldorf (DE)

( * ) Notice: Subject to any disclaimer, the term of this patent is extended or adjusted under 35 U.S.C. 154(b) by 226 days.

(21) Appl. No.: 09/649,906

(22) Filed: Aug. 26, 2000

(30) Foreign Application Priority Data

Aug. 25, 1999 (DE) .......................................... 199 41 121

(51) Int. Cl.⁷ ................................................ G01L 5/28
(52) U.S. Cl. ........................................................ 73/130
(58) Field of Search .......................... 73/121, 129, 462, 73/130; 340/71, 130

(56) References Cited

U.S. PATENT DOCUMENTS 3,673,563 A * 6/1972 Thielin et al. ................ 73/129
5,785,158 A * 7/1998 Grimm ...................... 88/181 T
5,974,878 A * 11/1999 Newell et al. ................. 73/462

* cited by examiner

*Primary Examiner*—Eric S. McCall
*Assistant Examiner*—Maurice Stevens
(74) *Attorney, Agent, or Firm*—Cohen, Pontani, Lieberman & Pavane

(57) ABSTRACT

A highly dependable process and device for monitoring wear for a holding brake is performed via an electronically controlled brake test. A shaft which is drivable by a motor can be braked by the holding brake. A reference angular position which is to be traveled by the motor during the brake test and which deviates from the current actual angular position of the motor is preset along with a maximum limit torque to be applied by the motor during the brake test are preset for the motor. During the brake test, the actual angular position of the shaft is monitored to determine whether the shaft rotates. The existence of wear in the holding brake is evidenced by rotation of the shaft during the brake test.

11 Claims, 1 Drawing Sheet

MEANS FOR MONITORING HOLDING BRAKE WEAR

BACKGROUND OF THE INVENTION

1. Field of the Invention

The present invention is directed to a method and a device for determining, i.e., detecting, wear in a holding brake which is used for braking a shaft driven by a motor.

2. Description of the Related Art

As a rule, a holding brake comprises an electromagnet which holds a shaft at a standstill via brake disks. That is, the holding brake reliably prevents the rotation of the shaft. For reasons of operating safety, it is imperative that a holding brake of this type brakes with sufficient strength. The braking action may be affected by wear and/or by the development of a layer of corrosion on brake disks when the brakes have not been actuated for a long period or have been stopped for a long time. For safe and reliable operation of the shaft on which the holding brake is arranged, reliable detection of wear is essential.

SUMMARY OF THE INVENTION

The object of the present invention is to detect wear in a holding brake in the most efficient manner possible and with sufficient dependability.

The object is met by a process for determining wear of a holding brake via an electronically controlled brake test, the holding brake comprising a brake arranged for braking a shaft drivable by a motor. The process comprises the steps of presetting a reference angular position which is to be traveled by the motor during the brake test and which deviates from a current actual angular position and presetting a maximum torque to be applied by the motor to the shaft when traveling to the reference angular position during the brake test, applying a torque not greater than the maximum torque for rotating the motor and the shaft to the reference angular position while the holding brake is applied, and determining the existence of wear when the shaft rotates, i.e., when the torque of the motor exceeds the holding power of the holding brake.

The object is also met by a device for determining wear in a holding brake via an electronically controlled brake test, the holding brake operatively arranged for braking a shaft which is drivable by a motor. The device includes a reference value preset device for presetting a reference angular position which is to be traveled by the motor during the brake test and which differs from a current actual angular position of the motor. The reference value preset device also presets a maximum limit torque to be applied by the motor during the brake test. The device further includes a detection device for detecting whether the shaft rotates during the brake test, wherein the existence of wear is determined when the shaft rotates and the absence of wear is determined when the shaft does not rotate The present invention allows the detection of wear in a very dependable manner by presetting a reference angular position of the shaft and a limit torque for a motor which is connected for driving the shaft. The present invention detects whether the shaft rotates when the holding brake is on and the motor applies the limit torque to the shaft.

This can be realized in an especially efficient manner particularly in a construction with a stored program control which presets a limit torque and reference angular position for the motor and reads out the actual angular position of the motor to determine whether the shaft which is drivable by the motor rotates. Rotation of the shaft indicates wear is present in the holding brake for the shaft.

A solution to this problem that is familiar to the person skilled in the art includes monitoring the current and voltage at the holding brake. However, this method does not carry out a sufficiently dependable monitoring of wear in a holding brake caused by the development of layers of corrosion on brake linings of the brake.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
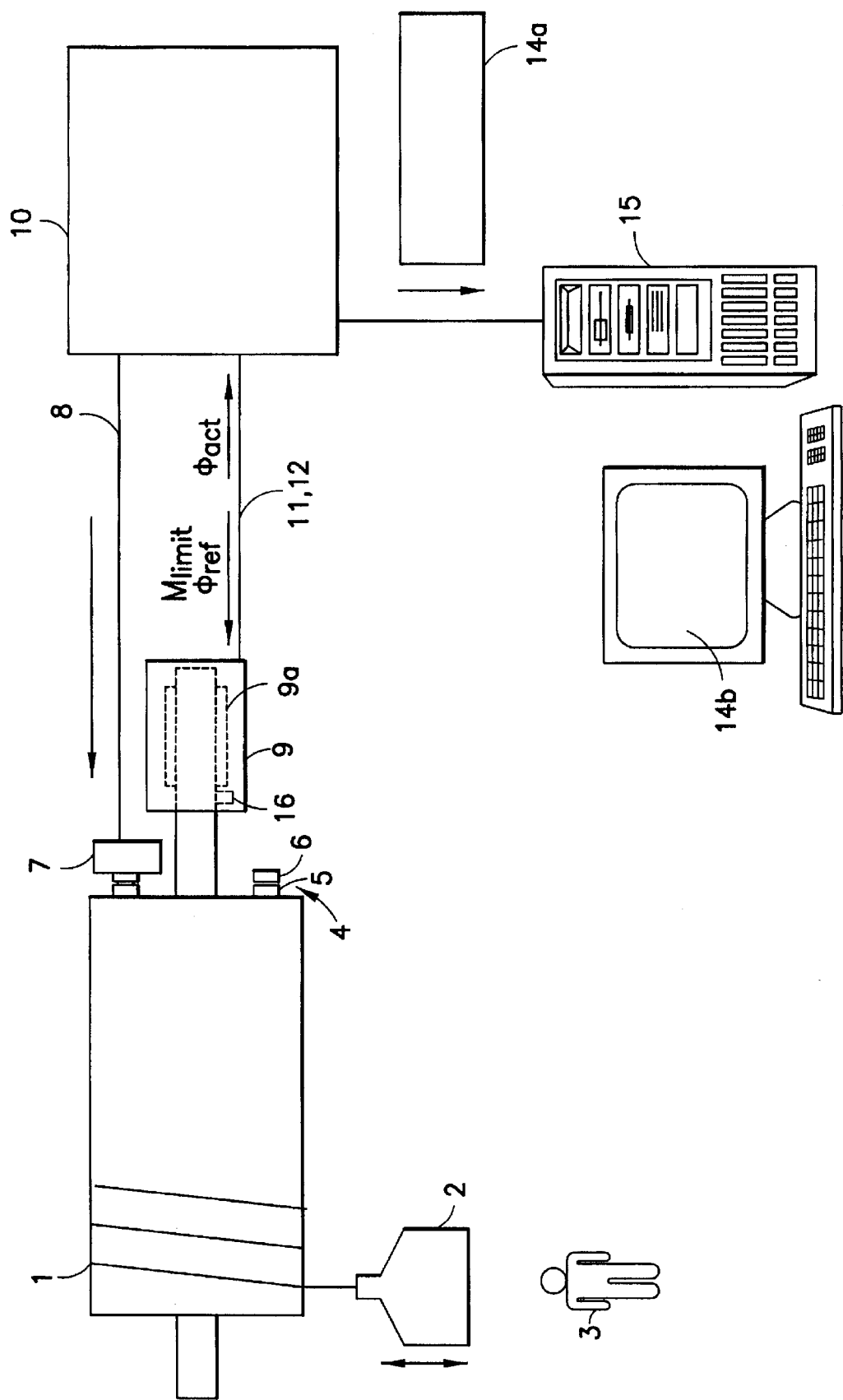
FIG. 1 is a schematic view of a holding brake and device used to determine the occurrence of wear of the holding brake according to the present invention.

FIG. 1 shows a shaft 1 on which a load 2 is suspended. The load 2 may be respectively raised and lowered by rolling and unrolling a rope which is wound on the shaft 1. The load 2 must be prevented from falling on persons 3 such as workers at a work site who are passing beneath the load 2. A holding brake 4 is arranged for preventing the load 2 from falling by braking the shaft 1 with brake linings 5, 6 which act against one another with adhesive friction for braking. The brake linings 5, 6 are pressed against one another with adhesive friction such as, for example, by a spring or a permanent magnet and may be spread apart by an electromagnet 7 for selectively disengaging the holding brake. The electromagnet 7 is supplied with current via lines 8 for disengaging, i.e., releasing, the holding brake 4.

The shaft 1 is rotatable by a motor 9 against the braking torque of the holding brake when the holding brake is not released and is rotatable as well when the holding brake is released. The motor 9 applies a torque M to the shaft whose maximum value may be limited. The motor 9 receives via a communications line 11, a reference angular position of the motor $\phi$ref and a maximum limiting torque Mlimit to be applied by the motor during a test of the holding brake. These values are determined by a stored program control SPC 10 operatively connected with a computer 15. The computer 15 may comprise a general purpose computer in which the SPC 10 is stored in a memory. Alternatively, the computer may comprise a micro processor be designed for performing the specific tasks of the SPC 10 in which case the SPC 10 is stored in a permanent memory, i.e., the SPC 10 may be hard wired. The SPC 10 receives an angular position signal $\phi$act which represents the current angular position of the shaft 1 and, therefore, the current angular position of the rotor of the motor. The angular position signal $\phi$act is transmitted from an angle sensor 16 to the SPC 10 via a communication line 12 which may comprise any type of communication line including, for example, an optical or an electrical communications line. Instead of being arranged in the motor 9 as shown in FIG. 1, the angle sensor 16 may be arranged at the shaft 1 for directly determining the current angle of the shaft 1.

Furthermore, the SPC 10 transmits a signal to the electromagnet 7 for releasing or engaging the brake 4 via the communications line 8. Instead of a signal, a voltage sufficient for releasing may be transmitted to the electromagnet via the communications line 8. According to the present invention, the SPC 10 tests whether the holding brake 4 still applies a sufficient limit torque for braking the shaft 1 or whether it is already worn. The test may be effected as follows: the SPC 10 first sends a signal to the electromagnet 7 to activate the holding brake 4, i.e., deenergize the electromagnet 7 to apply the holding brake 4. Of course, the holding brake may already be activated. Furthermore, it is not necessary for a load 2 to be suspended from the shaft 1 during the holding brake test to have only the braking torque of the holding brake and a driving torque of the motor applied to the shaft 1. The SPC 10 then transmits to the motor 9 (or an electronic circuit arranged at the motor 9) a reference angular position ref which represents an absolute angular distance to which the motor 9 will attempt to travel during the test or relative position to which the motor 9 will attempt to travel during the test via rotation of the rotor and the shaft 1. The SPC 10 also transmits a maximum value for a limit torque to be applied by the motor Mlimit during the test. The stored program control 10 now detects via the angle sensor 16 at the shaft 1 through subtraction of consecutive measurement values whether or not the motor rotates toward the reference angular position ref. That is, the SPC 10 determines whether the actual angular position act changes. When the actual angular position act of the motor 9 changes, i.e., the rotor 9a of motor 9 and the shaft 1 rotates, the angular torque of the holding brake 4 is no longer sufficient and wear (that is, wear above a maximum value due to falling below the limit torque of the holding brake) is present. Upon detection of wear, the SPC 10 emits an auditory warning signal 14a and/or a visual warning signal 14b on the screen of the computer 15 (e.g., "Urgent: Holding brake wear, service holding brake immediately!").

The holding brake test according to the present invention may be performed during extended periods of immobility of the shaft 1 braked by a holding brake such, for example, as at time intervals which can be preset by the SPC 10. Also, the holding brake test may be performed at any time it is deemed necessary by an operator or under determined conditions such as after the occurrence of errors or after extending standing of the shaft braked by the holding brake.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A process for determining wear of a holding brake using an electronically controlled brake test, the holding brake comprising a brake applicable to a shaft drivable by a motor for preventing rotation of the shaft when the motor is off, said process comprising the steps of:
    (a) presetting a reference angular position for the motor to attempt to travel during the brake test and which deviates from a current actual angular position and presetting a maximum torque to be applied by the motor to the shaft while attempting to travel to the reference angular position during the brake test;
    (b) applying a torque not greater than the maximum torque for attempting to rotate the motor and the shaft to the reference angular position while the holding brake is applied;
    (c) determining the existence of wear when the shaft rotates during said step (b); and
    (d) determining the absence of wear when the shaft does not rotate during step (b).

2. The process of claim 1, wherein said steps (a), (b), (c), and (d) are controlled by a stored program control, said step (a) further comprises the steps of determining, by the stored program control, the reference angular position and the limit torque for the motor and transmitting data representing the reference angular position and the limit torque from the stored program control to the motor, and each of said steps (c) and (d) further comprise reading, by the stored program control, an actual angular position of one of the shaft and the rotor of the motor to determine whether the shaft rotates during said step (b).

3. The process of claim 2, wherein said step (b) further comprises applying the holding brake operation of an electromagnet in response to the stored program control.

4. The process of claim 3, wherein said step (b) further comprises applying the holding brake by deactivating the electromagnet, the holding brake being operatively arranged for releasing the shaft in response to voltage applied to the electromagnet and braking the shaft when electromagnet is deactivated.

5. The process of claim 1, further comprising the step of performing steps (a), (b), (c), and (d) before each operation of the motor.

6. The process of claim 1, comprising the step of performing said steps (a), (b), (c), and (d) when a period of immobility of the shaft since the preceding brake test lies above a limit value.

7. The process of claim 1, comprising the step of performing said steps (a), (b), (c), and (d) at predetermined time intervals when the motor is stopped apart from the brake test.

8. The process of claim 1, wherein said step (c) further comprises emitting a warning signal comprising one of a visual warning signal and an acoustic warning signal when wear is determined in the holding brake.

9. A device for determining wear of a holding brake using an electronically controlled brake test, the holding brake comprising a brake applicable to a shaft drivable by a motor for preventing rotation of the shaft when the motor is off, said device comprising:
    means for presetting a reference angular position which is to be attempted to be traveled by the motor during the brake test and which deviates from a current actual angular position and presetting a maximum torque to be applied by the motor to the shaft when attempting to travel to the reference angular position during the brake test;

means for applying a torque not greater than the maximum torque for attempting to rotate the motor and the shaft to the reference angular position while the holding brake is applied;

means for determining the existence of wear when the shaft rotates in response to said means for applying a torque; and means for determining the absence of wear when the shaft does not rotate in response to said means for applying a torque.

10. A device for determining wear in a holding brake via an electronically controlled brake test, the holding brake operatively arranged for preventing rotation of a shaft which is drivable by a motor when the motor is off, said device comprising:

a reference value preset device for presetting a reference angular position which is to be attempted to be traveled by the motor during the brake test and which differs from a current actual angular position of the motor and for presetting a maximum limit torque to be applied by the motor when attempting to travel to the reference angular position during the brake test; and a detection device for detecting whether the shaft rotates during the brake test, wherein the existence of wear is determined when the shaft rotates and the absence of wear is to be determined when the shaft does not rotate.

11. The device according to claim 10, wherein said device comprises a stored program control.

* * * * *

UNITED STATES PATENT AND TRADEMARK OFFICE
CERTIFICATE OF CORRECTION

PATENT NO. : 6,651,494 B1
DATED : November 25, 2003
INVENTOR(S) : Thomas Herterich It is certified that error appears in the above-identified patent and that said Letters Patent is hereby corrected as shown below:

<u>Title page,</u>
Item [22], should read -- [22] Filed: Aug. 25, 2000 --

Signed and Sealed this

Sixteenth Day of March, 2004

JON W. DUDAS
*Acting Director of the United States Patent and Trademark Office*